VAN KIRK & FULTON.
Lamp.
No. 1,601. Reissued Jan'y 5, 1864.
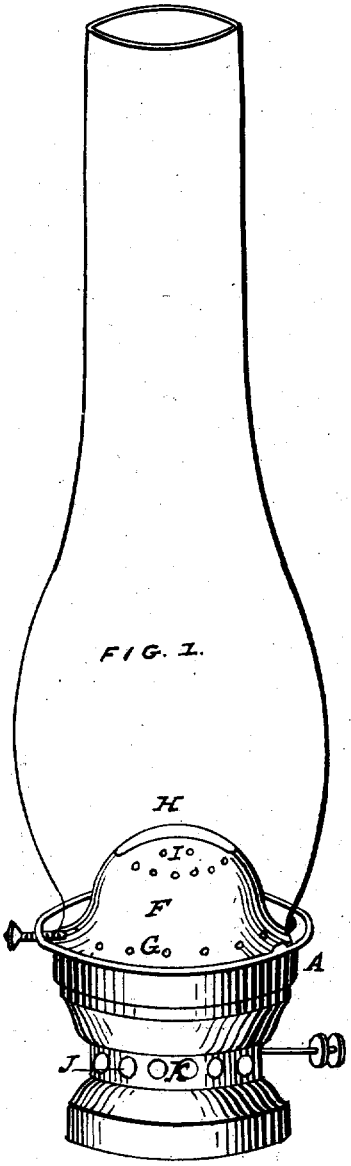
FIG. 2.
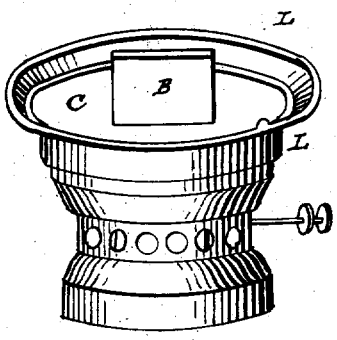
FIG. 3.
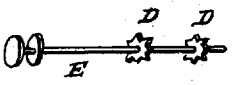
FIG. 4.
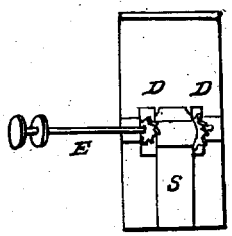
WITNESSES:
Wm J Pabbe
Notary Public
INVENTOR.
T. T. Van Kirk
Wm M Fulton
N. PETERS, Photo-Lithographer, Washington, D. C.

UNITED STATES PATENT OFFICE.

JOSEPH T. VAN KIRK, OF PHILADELPHIA, PENNSYLVANIA, AND WILLIAM M. FULTON, OF ELIZABETH CITY, NEW JERSEY.

IMPROVEMENT IN LAMPS.

Specification forming part of Letters Patent No. 26,310, dated November 29, 1859; Reissue No. 1,601, dated January 5, 1864.

*To all whom it may concern:*

Be it known that we, JOSEPH T. VAN KIRK, of Philadelphia, (Frankford,) State of Pennsylvania, and WILLIAM M. FULTON, of Elizabeth, formerly of Cranberry, State of New Jersey, have invented a new and Improved Lamp-Burner for Burning Coal-Oil; and we do hereby declare that the following is a full, clear, and exact description thereof, reference being had to the accompanying drawings, and to the letters of reference marked thereon, making a part of this specification.

Figure 1 is an external view of our invention with the glass chimney applied to it. Fig. 2 is also an external view with the cap off, so as to expose the wick, tube, and perforated plate or gauze wire. Fig. 3 is the solid wheel. Fig. 4 is the wick-tube with the spring and solid wheel attached.

Our invention consists of or in a particular construction of the wick-tube and its combination with a peculiarly formed spindle and wheels for raising the wick, and in so connecting such spindle and wheels to the wick-tube that it, the spindle, will accommodate itself or its position to wicks of different thicknesses, and at the same time the wick will be held or retained in its proper position when adjusted.

A represents the top of a lamp, which is fitted on a fountain or reservoir of the usual or any proper or desired form, and which is generally constructed of metal. B is the wick-tube, which is of oblong form to receive what is generally known as the "flat" or "square" wick. Wick-tubes for lamps, as heretofore constructed, have been made of sheet metal bent into proper shape, having the edges slightly lapped, or merely brought together, and sometimes soldered. When the edges are so lapped, or merely brought together, there will necessarily be more or less leakage, and when the edges are soldered there is a great liability of their becoming unsoldered by the intense heat from the combustion of the lamp. The interior of the tube is also likely to be rough, and thus interfere with the free movement of the wick. All these objections are removed by our construction of wick-tube.

By our invention the wick-tube is drawn out of a solid piece of metal without seam or break, and thereby secures the several advantages of furnishing a smooth receptacle for the wick, a tube which will not leak, and a sure preventive against the joint opening by the melting of the solder. Such wick-tube passes through the perforated plate or wire-gauze C, as shown in Fig. 2.

D D are the wheels for raising and lowering the wick, and placed upon the spindle E. The spindle E rests on one side on the spring *s*, and on the other side against the tube, which is perforated to receive the wheels D D, as shown in Fig. 4. Such spring is attached by its lower end at or toward the bottom of the wick-tube, as shown in Fig. 4, and is so bent or shaped, as also shown in said figure, as to furnish a support for the spindle E and also allow such spindle to accommodate itself in position to wicks of different thicknesses, while at the same time it acts against the spindle, causing its wheels to press against the wick, so that when the lamp is used on board of cars, &c., the wick will remain stationary, and will not fall in the tube.

As heretofore constructed the wheels D D and the spindle E are made separate from each other, and the former are then soldered or fastened to the spindle. When so constructed, the wheels are very liable to become loosened by the melting of the solder, or from other causes, and then their action is imperfect and unsatisfactory. To remedy these defects we form the spindle and the wheels of a single solid piece of metal, the wheels being turned out or struck up. The wheels thus will always retain their proper position on the spindle and their action is always uniform.

The cap F is so arranged that it rests or sits on the brass ring which surrounds the gauze wire C. Through the lower part of this cap openings G are made extending all around the cap, and an oblong slot, H, is made through the top of the cap, on both sides of which slot-openings I are made, varied according to the size of the burner, and which admits a greater supply of oxygen than would naturally pass through the slot to combine with the carbon of the oil when in combustion.

The bottom J communicates with the external air, as shown at K, the air passing through the perforated plate or air-distributer C, and then through the openings G in the lower part of the cap F, and a part through the openings I in the upper part of the cap, and the remainder passing the slot H.

The perforated plate or gauze wire C serves to distribute the air evenly to the flame and in the cap, and the holes in the top of the cap tend to present the air evenly to the top of the flame.

The wick-tube B is first drawn as a round tube, and is then flattened over one or more suitable dies prepared for such purpose and given the required shape, and then the proper holes for the wheels D D punched through it.

What we claim as our invention, and desire to secure by Letters Patent, is—

1. Forming the wick-tube of lamps using a flat wick of or from a solid continuous piece of metal without lap, joints, or seam, substantially as and for the purposes set forth.

2. The combination of a wick-tube so formed with the spindle E and wheels D D when formed from a single piece of metal, as described.

3. Supporting the spindle E and wheels D D by a spring, substantially as and for the purposes set forth.

J. T. VAN KIRK.
WM. M. FULTON.

Witnesses:
S. D. LAW,
WM. J. DELLE RU.